United States Patent [19]
Shillady

[11] Patent Number: 5,437,184
[45] Date of Patent: Aug. 1, 1995

[54] CAPACITIVE LIQUID LEVEL SENSOR HAVING PHASE DETECTING CIRCUITRY

[75] Inventor: Robert W. Shillady, N. Wales, Pa.

[73] Assignee: KDI/Triangle Electronics, Inc., Cincinnati, Ohio

[21] Appl. No.: 144,131

[22] Filed: Oct. 27, 1993

[51] Int. Cl.6 .............................................. G01F 23/26
[52] U.S. Cl. ................................................. 73/304 C
[58] Field of Search ....................... 73/304 C; 324/690

[56] References Cited

U.S. PATENT DOCUMENTS

| | | |
|---|---|---|
| 2,519,668 | 8/1950 | Konigsberg . |
| 2,544,012 | 3/1951 | Edelman . |
| 2,621,517 | 12/1952 | Sontheimer . |
| 2,638,000 | 5/1953 | Sontheimer . |
| 2,648,058 | 8/1953 | Breedlove . |
| 2,651,940 | 9/1953 | Kline . |
| 2,751,531 | 6/1956 | Barrett . |
| 2,866,337 | 12/1958 | Minneman et al. . |
| 2,868,015 | 1/1959 | Haropulos . |
| 3,343,415 | 9/1967 | Johnston . |
| 3,391,547 | 7/1968 | Kingston . |
| 3,534,606 | 10/1970 | Stamler et al. . |
| 3,552,209 | 1/1971 | Johnston . |
| 3,620,080 | 11/1971 | Ryder . |
| 3,935,739 | 2/1976 | Ells . |
| 4,086,528 | 4/1978 | Walton . |
| 4,173,893 | 11/1979 | Hedrick . |
| 4,235,106 | 11/1980 | Maltby et al. . |
| 4,258,422 | 3/1981 | Dougherty et al. . |
| 4,266,144 | 5/1981 | Bristol . |
| 4,350,039 | 9/1982 | van Dyke et al. . |
| 4,417,473 | 11/1983 | Tward et al. . |
| 4,470,008 | 9/1984 | Kato . |
| 4,482,891 | 11/1984 | Spencer ........................ 340/620 |
| 4,499,766 | 2/1985 | Fathauer et al. . |
| 4,545,020 | 10/1985 | Branfield . |
| 4,553,434 | 11/1985 | Spaargaren . |
| 4,589,077 | 5/1986 | Pope . |
| 4,676,101 | 6/1987 | Baughman . |
| 4,780,705 | 10/1988 | Beane . |
| 4,841,227 | 6/1989 | Maier . |
| 5,138,880 | 8/1992 | Lee et al. . |
| 5,142,909 | 9/1992 | Baughman . |

FOREIGN PATENT DOCUMENTS

| | | | |
|---|---|---|---|
| 103321 | 3/1984 | European Pat. Off. .......... | 73/304 C |
| 2662249 | 11/1991 | France . | |
| 58-123431 | 7/1983 | Japan . | |
| 4-359122 | 12/1992 | Japan ................................. | 73/304 C |
| 2066961A | 7/1981 | United Kingdom . | |
| 748138 | 7/1980 | U.S.S.R. . | |

*Primary Examiner*—Thomas B. Will
*Assistant Examiner*—Willie Morris Worth
*Attorney, Agent, or Firm*—Harness, Dickey & Pierce

[57] ABSTRACT

A capacitive liquid level sensor having phase detecting circuitry incorporates a capacitive sensor array, an oscillator generating an input signal, a switching circuit sequentially coupling the input signal to the input plates of the capacitive sensor, one at a time, a pair of phase lock loop circuits (PLLs) each having voltage controlled oscillators (VCOs), a second switching circuit selectively coupling the output plates of the capacitive sensor array, in sequential fashion, to the PLLs, and an exclusive OR-gate (XOR) receiving the outputs of the VCOs from each of the PLLs. The XOR generates a first logic level signal when a difference in the phase of two signals from any two adjacent output plates indicates that a phase difference is present. A second logic signal is generated if no phase difference is detected. The signals are perfectly in phase when any two adjacent output plates are either submerged in fluid or both disposed in air. The phases of the output signals differ, however, when the two adjacent output plates are such that one is submerged in fluid while the other is at least partially disposed in air. Signal conditioning means including a pair of D flip flops and a resistive ladder coupled through a switching network provide an output signal to an optional display device for indicating a corresponding fluid level within a fluid reservoir within which the capacitive sensor array is disposed. In an alternative embodiment an integrator is included for determining the composition of the fluid being sensed.

17 Claims, 5 Drawing Sheets

FIG. 3A.

CAPACITIVE LIQUID LEVEL SENSOR HAVING PHASE DETECTING CIRCUITRY

BACKGROUND OF THE INVENTION

1. Technical Field

This invention relates to liquid level sensors, and more particularly to a capacitive liquid level sensing apparatus incorporating phase detecting circuitry for detecting and providing an output of a fluid level within a fluid reservoir.

2. Discussion

The emergence of composite fuels and the need for much better accuracy in the determination of fluid levels within fluid reservoirs has resulted in new requirements for fuel gauges of various vehicles, and also the drafting of new requirements for fuel gauges by the automotive industry. At present, previously unmeasured fluid levels such as those associated with transmission fluid, engine oil and radiator coolant are now being considered for continuous level sensing. The available methods for measuring variable fluid type levels heretofore have not provided sufficient accuracy of the sensed liquid level, have been ill-suited to the hostile environments of various fluids or are very costly to manufacture.

A variety of technologies and techniques have been used thus far in fluid level sensor designs. Some of the designs meet many of auto industry requirements but, to date, a completely satisfactory fluid level sensor design has yet to be produced which meets all present day auto industry requirements.

The largest category of fluid level sensor designs involve an approach which makes use of a capacitive sensing probe disposed in the fluid to be monitored. The capacitive probe is typically positioned vertically within a reservoir containing the fluid and along the axis of measurement such that the amount of area of the capacitive element of the probe which is covered by the fluid in the reservoir ultimately provides an indication of the level of the fluid.

The capacitive probe type Sensor typically utilizes some form of capacitance measurement to determine the fluid level. With these systems the dielectric constant of the fluid relative to that of air is the key to the accuracy of the measurement. The range of the probe capacitance is highly dependent on the dielectric constant of the fluid. The relative dielectric constant of air is near unity and changes negligibly under varying ambient conditions. The relative dielectric constant of the fluid, however, can change dramatically. The conductance of the various fluids typically monitored can vary dramatically, which in turn can significantly impact the dielectric constant since it is comprised of both a real and imaginary component.

Some previously designed systems incorporating capacitive probe technology have involved going to great lengths to fully characterize the dielectric constant to effect an accurate measurement. This determination is typically accomplished by some form of in-situ measurement of the dielectric constant. Other approaches attempt to avoid the effects of the varying dielectric constant by attempting to remove the variation from the measurement. One such method to avert the dielectric constant variation has been to segment one or both of the capacitor elements of the capacitive probe into an array of smaller elements whose axis aligns with that of the measured fluid level. Provided that a sufficient number of independent capacitive segments is provided, the most simple form of this measurement becomes the determination of the absence or presence of the dielectric material (i.e., the fluid) in this instance.

Recently released requirements, typical of the auto industry at large, for a fuel level sensor are listed below to provide an idea of the stringency of present day operational parameters which a fuel level sensor must meet:

| | | |
|---|---|---|
| A. | Temperature Range - $(-)40°$ C. to $150°$ C. | |
| B. | Life - 20 Years | |
| C. | Response Time - 15 milliseconds | |
| D. | Accuracy | - 0.5 gallons minimum |
| | | - 0.1 gallons preferred |
| E. | EMI/RFI - Must be operational in close proximity to fuel pump | |
| F. | Fuel Tolerance - Sensor must be capable of meeting accuracy requirements for the following fuel types: TF1 TF2 UNLEADED GASOLINES 100% INDOLENE HO-III PEROXIDE FUEL MIX METHANOL FUEL MIX CORROSIVE GASOHOL Additionally, the sensor must be capable of limited exposure to 2 RVP Fuel as well as not being adversely affected by exposure to legal and commercial fuels in the Asian, Mideast and European markets. | |
| G. | Underbody Contaminants - The sensor must withstand prolonged exposure to the following list of potential underbody contaminants: | |
| | Engine Oil | Transmission Fluid |
| | Power Steering Fluid | Coolant/Antifreeze |
| | Brake Fluid | Windshield Wash Fluid |
| | Transaxle/Differential Lube | Wheel Bearing Lube |
| | | A/C Refrigerant |
| | | Acid Rain |
| | Water | Waxes, Paint Sealants |
| | Snow, Ice | Tire Cleaners |
| | Car Wash Chemicals | Carpet Cleaners |
| | Steam Cleaning | |
| | Engine Cleaning | |
| | Soft Drinks, Coffee, Etc. | |
| H. | Space/Size Requirements - The sensor shall be contained within the following form factors: | |
| | 15 × 4 × 175 MM | 15 × 4 × 400 MM |
| | 10 × 6 × 175 MM | 10 × 6 × 400 MM |
| I. | Electrical Requirements - Operational Voltage: 10.5 to 16.5 volts Output voltage: 0 to 4.8 volts linearly related to measured level. | |
| J. | Mechanical Requirements - Sensor must survive a three feet vertical drop and still meet the electrical requirements. | |

Coupled with the above requirements is a demand for a low manufacturing cost. This places an additional constraint on the design of the liquid level sensing system. In summary, the fluid level sensing system must accurately measure a variety of materials in a hostile environment and be capable of manufacture at a relatively low cost.

Accordingly, it is a principal object of the present invention to provide a liquid level sensing apparatus incorporating a capacitive probe in which the accuracy of the apparatus is not affected by changes in the dielectric constant due to the temperature of the fluid, the composition of the fluid or other factors which cause a variation of the dielectric constant.

It is another object of the present invention to provide a liquid level sensing apparatus which is capable of at least meeting typical auto industry requirements for a fuel level sensor, while still being capable of manufacture at a relatively low cost.

It is yet another object of the present invention to provide a fluid level sensing apparatus which is capable of determining differences in the composition of the fluid being sensed without adding significant complexity to the determination of the fluid level measurement.

It is still another object of the present invention to provide a fluid level sensing apparatus which incorporates a capacitive sensing probe which is relatively simple in construction and well adapted to withstand the hostile environment of a variety of fluids typically used in motor vehicle applications for lubrication and/or cooling purposes.

It is still another object of the present invention to provide a liquid level sensing apparatus whose operation is generally not effected by bumps, jolts, or other like movements typically experienced with moving motor vehicles, which movements could adversely effect the accuracy and/or operability of prior art liquid level sensing systems.

It is yet another object of the preset invention to provide a liquid level sensing apparatus which incorporates phase detecting circuitry for accurately detecting a fluid level within a fluid reservoir, the accuracy of which is not adversely affected by changes in the composition of the fluid, its temperature or any other environmental factor acting on the fluid.

It is still another object of the present invention to provide a fluid level sensing apparatus which quickly, in real-time, can respond to very rapid changes in the level of a fluid and provide an accurate indication in real-time of the level of the fluid within a given reservoir.

SUMMARY OF THE INVENTION

The above and other objects are provided by a liquid level sensing apparatus incorporating phase detecting circuitry in accordance with preferred embodiments of the present invention. The apparatus generally includes a capacitive sensor array which is adapted to be placed in a fluid reservoir. The capacitive sensor array comprises a plurality of input plates and a plurality of output plates positioned closely adjacent the input plates. The output plates are further arranged along the axis of measurement such that each input plate "overlaps" two adjacent output plates.

The apparatus further includes oscillator means for producing a fixed frequency input signal which is input to each one of the input plates on the sensor array. Since each input plate overlaps two adjacently positioned output plates, exciting any one input plate with the input signal causes a current to be coupled to the two adjacent capacitive output plates which it overlaps. Since the same input signal excites both output plates the phase of the signals from the two output plates will be in phase, assuming the dielectric constant is the same for the two plates.

Further included is first phase detecting means responsive to each one of the output plates of the array for providing a signal indicative of the phase of the signal coupled to any given one of the output plates; second phase detecting means responsive to each output plate for providing a signal indicative of the phase of any given one of the output signals; input switch control means for sequentially applying the input signal to each one of the input plates of the capacitive sensor array; and output switch means for controllably coupling adjacent ones of the output plates sequentially, one pair at a time, to first and second phase detecting means. Means for controlling each of the input and output switch means is included for synchronizing the input and output switch control means such that adjacent pairs of output plates are coupled to the first and second phase detecting means at the same time the input plate which overlaps a portion of each one of the coupled output plates is coupled to the oscillator means.

Means for comparing the phase of each of the output signals from each of the phase detecting means generates a first signal indicative of no phase difference between the output signals of the first and second phase detecting means and a second signal indicative of the presence of a phase difference between the output signals from the phase detecting means. The first output signal, being indicative of no phase difference between the signals output from any particular pair of adjacent output plates, further indicates that the dielectric constant is the same for the two adjacent output plates. This also indicates that both of the output plates being sensed are either completely submerged in fluid or both positioned completely in air. The second output signal from the phase comparing means is indicative of a condition wherein one of the pair of output plates being compared is submerged in fluid while the other adjacent output plate of the pair is disposed at least partially in air. Accordingly, it can be further deduced that there is a fluid/air interface close to the area of the two adjacent output plates being compared when a phase difference is present in the output signals of any particular pair of output plates being sensed.

Thus, by sequentially comparing the phase of output signals from the output plates of adjacent capacitive output plates, sequentially, one pair of plates at a time, a very close approximation of the liquid/air interface level within the reservoir can be obtained. By knowing the overall volume of the reservoir and taking into consideration the shape of the reservoir, a determination can readily be made as to the level of fluid within the reservoir.

In the preferred embodiments of the invention signal conditioning circuitry is included for receiving the first and second output signals from the phase comparing means and generating appropriate signals to drive a display or indicating means. The display or indicating means can provide a visual indication of the fluid level within the reservoir.

In the preferred embodiments the oscillator means comprises a conventional oscillator circuit for applying an alternating current signal of a predetermined frequency, in the preferred embodiment preferably about 18 MHz, sequentially to each input plate on the sensor array. Each of the first and second phase detecting means preferably comprises a phase lock loop circuit having its own voltage controlled oscillator (VCO). The phase comparing means is preferably comprised of an exclusive OR-gate (XOR) which generates either logic one ("1") level output signal or a logic zero ("0") level output signal. In the preferred embodiment a logic one level signal indicates that the output signals from the adjacent output plates being sensed are not in phase, thereby indicating a difference in the dielectric constant between the two capacitive output plates. A logic zero level signal indicates that the output signals from the adjacent output plates are in phase. This in turn indicates that the two adjacent output plates are either submerged in fluid or both disposed in air.

In the preferred embodiments, the signal conditioning means is comprised of a pair of type D flip flops which are used, in connection with a switching circuit and a resistive ladder, to provide a fluid level output signal suitable for output to a display means. The fluid level output signal represents the percentage of the capacitive sensor array submerged in fluid from which the level of the fluid within the reservoir can be extrapolated.

In an alternative preferred embodiment of the present invention integrator means is included for generating a signal indicative of the "composition" of the fluid being sensed. The integrator means preferably comprises a conventional integrating circuit which has its input coupled to the output of the phase comparing means. When the integrator means is implemented, a signal indicative of the composition of the fuel (e.g., type of fuel) can be provided in addition to that indicative of the level of fluid within the reservoir. The integrator means is particularly useful in certain applications such as those involving monitoring fuel within a fuel tank for the presence of water therein.

BRIEF DESCRIPTION OF THE DRAWINGS

The various advantages of the present invention will become apparent to one skilled in the art by reading the following specification and subjoined claims and by referencing the following drawings in which:

FIG. 2 is a schematic diagram of the uppermost eight input plates and eight output plates of the capacitive sensor array, and the interconnections between the input plates and the first pair of switches which couple the sensor array to the oscillator, and also the interconnections between the output plates and the second plurality of switches which couple the output plates with the two phase lock loop circuits;

DETAILED DESCRIPTION OF THE PREFERRED EMBODIMENTS

Figure 1:
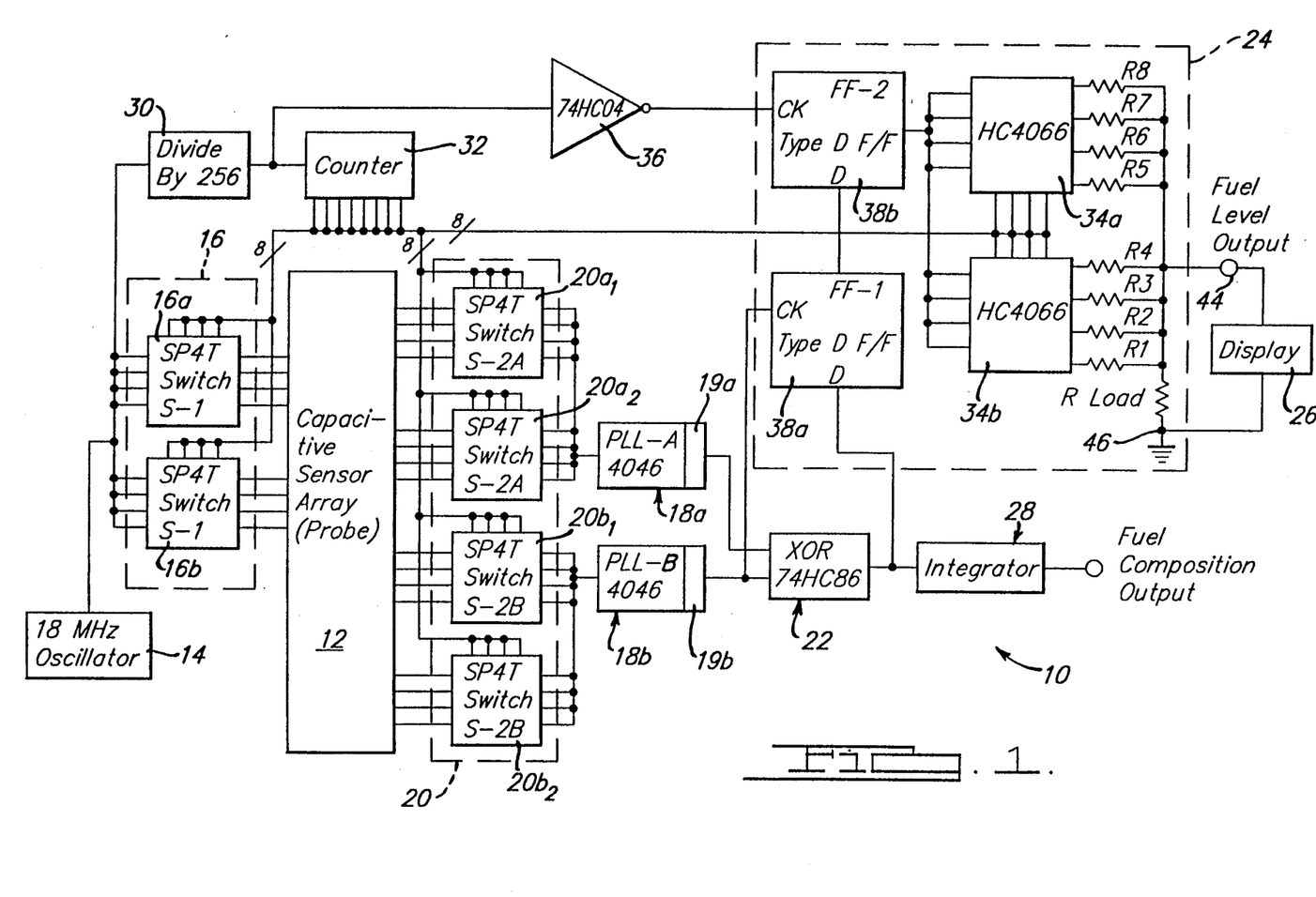
FIG. 1 is a detailed block diagram of a preferred embodiment of a liquid level sensing apparatus in accordance with the present invention and also showing the optional integrator circuit.

Referring to FIG. 1, there is shown a liquid level sensing apparatus 10 in accordance with a preferred embodiment of the present invention. The apparatus 10 comprises a capacitive sensor array (i.e., "probe") 12, an oscillator 14 for generating an alternating current input signal of a predetermined frequency; an input switching circuit 16 for sequentially coupling the input signal from the oscillator 14 to the individual capacitive input plates (described in more detail momentarily) of the capacitive sensor array 12; a first phase detecting circuit in the form of a phase lock loop (PLL) 18a having a voltage controlled oscillator (VCO) 19a; a second phase detecting circuit in the form of a phase lock loop circuit 18b having a voltage controlled oscillator 19b; and an output switching circuit 20 for controllably, sequentially coupling adjacent pairs of output plates of the capacitive sensor array 12 to the inputs of the phase lock loops 18a and 18b.

The output of each VCO 19a and 19b is coupled to a phase comparing device in the form of an exclusive OR-gate 22. The exclusive OR-gate 22 compares the phase of the outputs of the VCO 19a and VCO 19b and generates a first output signal indicative of no phase difference between the two signals and a second output signal indicative of a phase difference therebetween. Signal conditioning means 24 is included for receiving the first and second output signals of the exclusive OR-gate 22 and generating appropriate signals for driving an external display device 26 for indicating a level of fluid within a reservoir within which the capacitive probe 12 is disposed. It should be appreciated that the display 26 could take the form of any display suitable for providing a visual (or even audible) indication of the level or volume of fluid in the reservoir. The appended claims are not limited to any particular form of display and those of ordinary skill in the art will appreciate that a wide variety of displays could be incorporated for use with the apparatus 10 of the present invention.

Also as shown in FIG. 1 is an optional integrator circuit 28 which is responsive to the output of the exclusive OR-gate 22. The integrator circuit 28 integrates the output of the exclusive OR-gate 22 which provides an indication of the composition of the fluid within the reservoir. While completely optional, it is believed that in many applications it will be desirable to include the integrator circuit 28. In particular, when the apparatus 10 is used to sense fuel within a fuel tank of a vehicle the output signal of the integrator circuit 28 can indicate the presence of water within the fuel tank. This will be described in more detail in connection with the description of operation of the apparatus 10.

With continued reference to FIG. 1, the apparatus 10 further preferably includes a divide by 256 divider circuit 30 which receives the output of the oscillator 14, which is preferably about 18 MHz. The divider circuit 30 divides down the 18 MHz frequency of the signal output from the oscillator 14 to generate a clock signal of about 70.3125 KHz. The clock signal is used to clock a counter 32 which generates a plurality of switch control signals to control the sequencing of the input and output switching circuits 16 and 20, respectively. The counter 32 further controls, in part, a switching circuit 34 within the signal conditioning circuitry 24.

The output of the divider circuit 30 is further applied to the input of an inverting amplifier 36, the output of which is used as a clock signal for clocking a type D flip flop 38b of the signal conditioning circuit 24. The output of the inverting amplifier 36 is thus the 70.3125 KHz signal inverted. The D input of the D flip flop 38b is coupled to an output of another type D flip flop 38a which is clocked by a signal from the output of the VCO 19b of the phase lock loop 18b. The flip flops 38a and 38b operate to help control switching circuits 34a and 34b, which each comprise single pole, four throw switching circuits.

Referring now to FIG. 2, a portion of the capacitive probe 12 is shown illustrating the uppermost eight pairs of capacitive plates which together with the other components illustrated in FIG. 1 form a complete, independent sensing module. In practice, it is anticipated that preferably about five such independent modules each having eight pairs of capacitive plates therein will be sufficient to provide the desired degree of accuracy (i.e., resolution) in determining a fluid level within a given reservoir. Of course, smaller or larger reservoirs may require either a greater or lesser number of modules to provide sufficient accuracy of the detected fluid level.

Figures 3, 4:
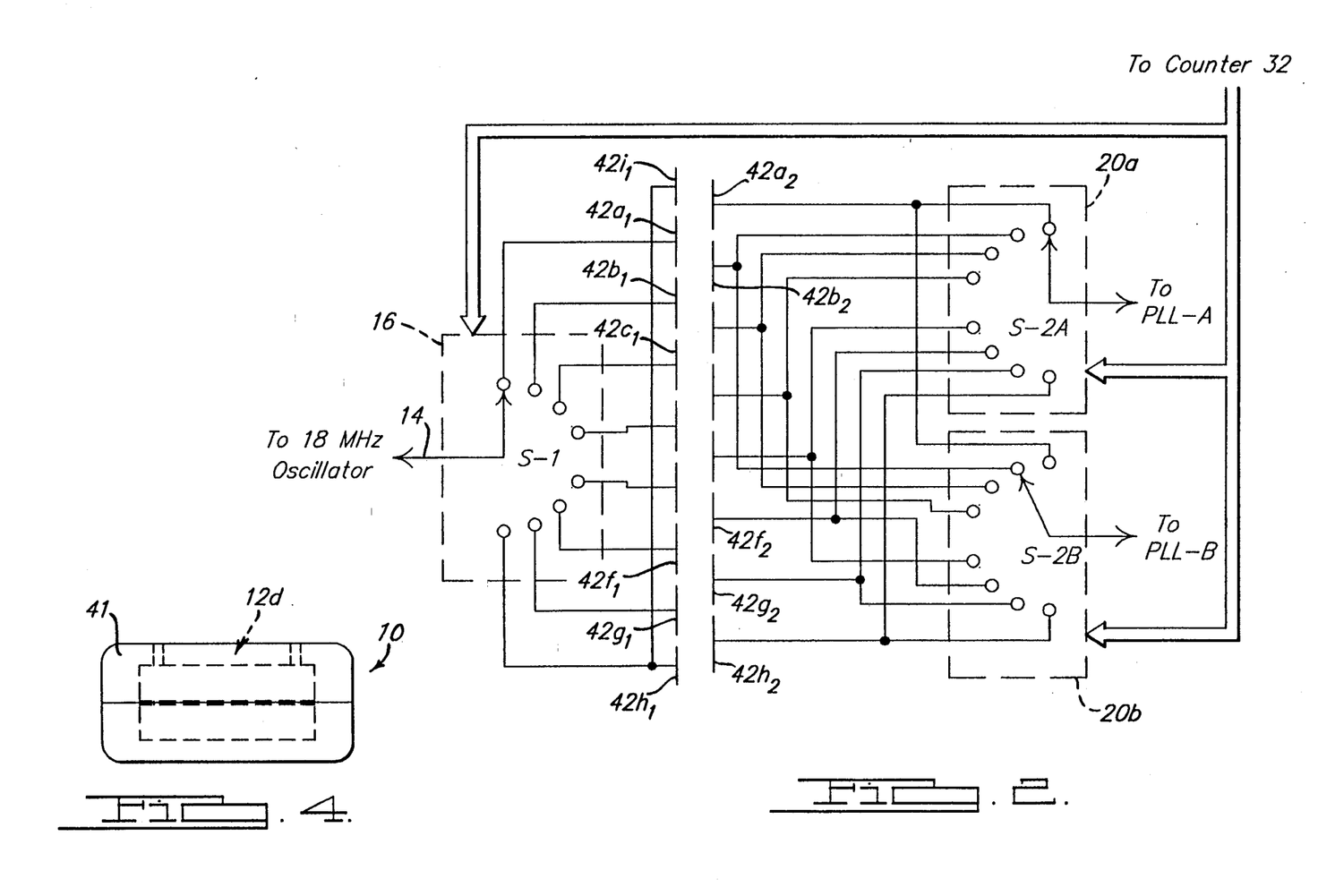
FIG. 3 is an elevational view of the capacitive sensing probe showing the preferred arrangement of five groups of eight capacitors each spaced longitudinally along the length of the probe along the axis of measurement.
FIG. 4 is a top view of the capacitive probe of FIG. 3.
Figure 3:
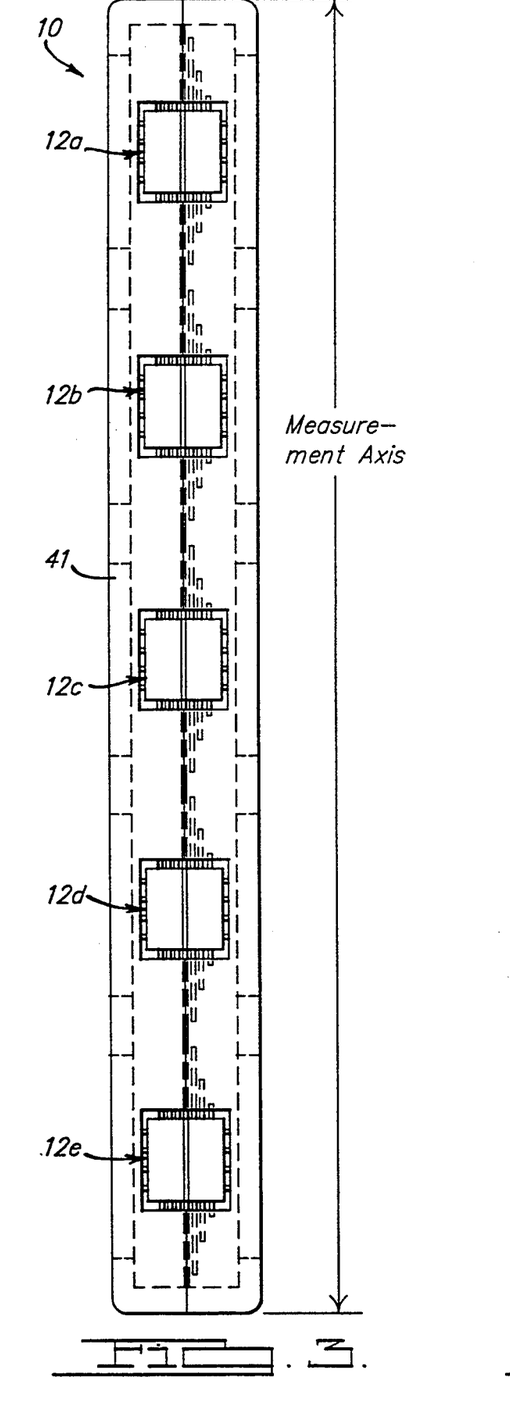
Figure 5:
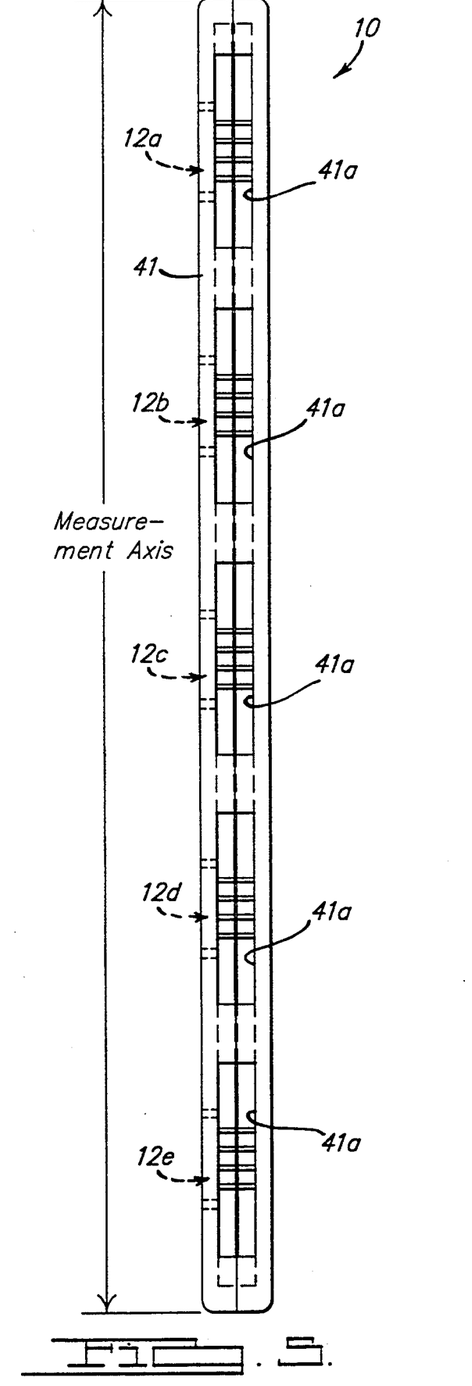
FIG. 5 is a side view of the capacitive probe of FIG. 3.

The anticipated preferred configuration for the capacitive sensor probe 12 is illustrated in FIGS. 3-5. Referring briefly to these figures, it will be noted that the capacitive sensor probe 12, in the preferred form, incorporates five independent modules designated 12a-12e which are disposed on an elongated substrate 40a. Each of the modules 12a-12e preferably includes a plurality of eight pairs of capacitive plates. Hence, the preferred form of the capacitive probe 12 includes a total of 40 individual pairs of capacitive plates thereon spaced along the longitudinal axis of measurement which are capable of detecting 41 distinct levels within a reservoir. The substrate 40 can be formed from any ceramic or plastic material impervious to the fluid materials delineated in the industry requirements set forth hereinbefore. The material must also be capable of withstanding the environment invoked in these standards. Since each entire module is intended to be immersed in fluid, the modules 12a-12e must be capable of withstanding this exposure. To this end suitable sealants are preferably used to ensure that the entire apparatus 10 is impervious to the deleterious affects of the immersion and the typically hostile environment. The dimensions of the sensor are dependent on the application because of the wide variety of shapes which the fluid reservoir may take and the required resolution (i.e., accuracy).

Conventional HC CMOS logic is used for implementation of the circuitry of the apparatus 10. Preferably, all of the circuitry of the apparatus 10 is condensed into a single application specific integrated circuit (ASIC) which is disposed on the substrate 40. The ASIC circuit is preferably suitable to handle up to eight pairs of capacitive elements which will suffice to determine nine distinct fluid levels. If greater resolution is required, each of the modules may be cascaded to fulfill the requirements of the particular application.

The module substrate 40 is held rigidly in place by a suitable plastic frame 41 having access holes 41a for the fluid within the reservoir. The access holes 41a are further shaped to allow a sufficient supply of fluid to help prevent false measurements when sloshing is present within the reservoir. The specific forms of electrical and mechanical connections of the sensor probe 12 are not shown, but will be well understood by those of ordinary skill in the art to be designed for the specific application and type of reservoir to be used with the apparatus 10.

Figure 3A:
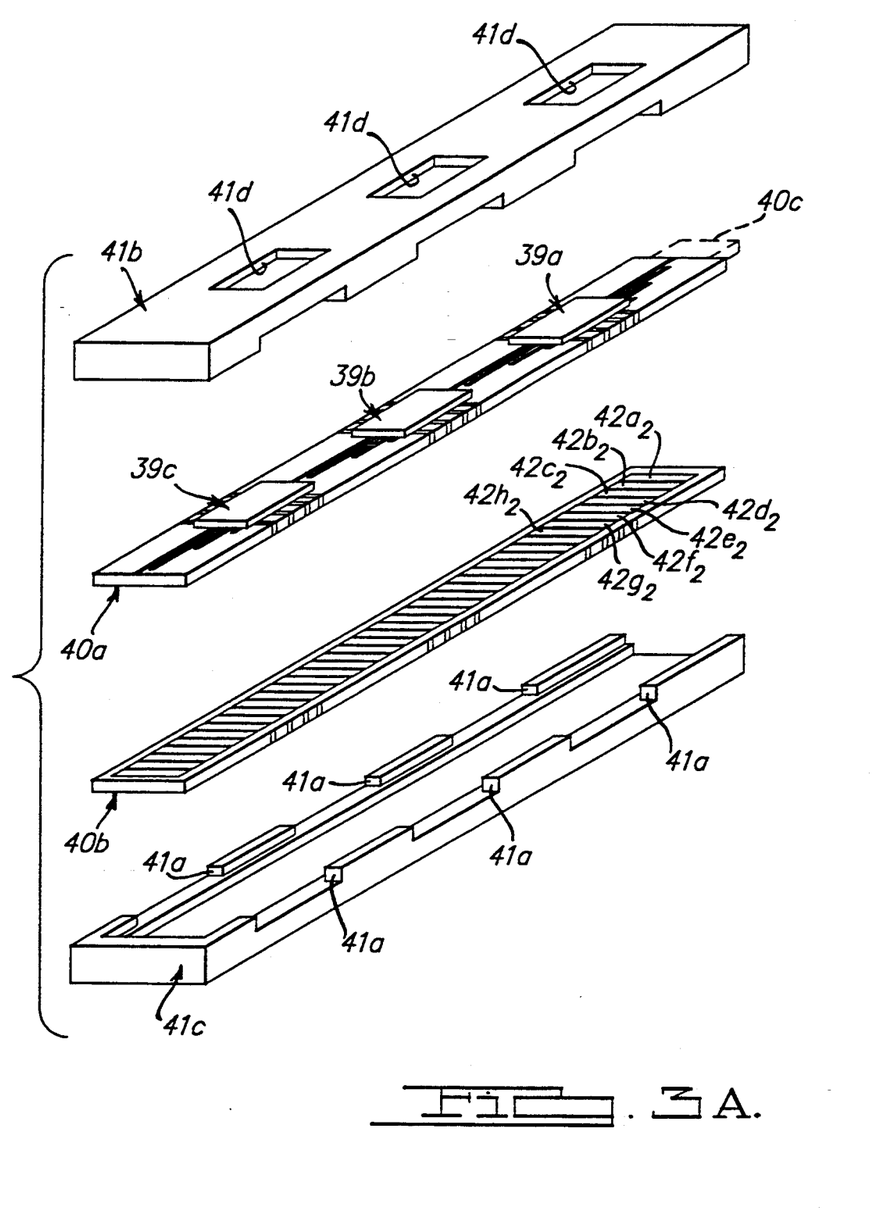
FIG. 3A is an exploded perspective view of the components of the probe of FIG. 3.

With specific reference to FIG. 3A, the frame 41 is comprised of sections 41b and 41c while the substrate 40 is comprised of sections 40a and 40b. Any suitable connector 40c is electrically coupled to the modules 12a-12e to enable signals from the apparatus 10 to be transmitted over a suitable conductor or bus, out of a reservoir, to the display device 26 or other electronic equipment. It will be appreciated that a mating connector and/or conductor will be required to couple with connector 40c, with the type of connection being dependent on the type of reservoir being used.

Referring further to FIG. 3A, frame portion 41b includes cut-outs 41d which allow ASICs 39a-39e of each module 12a-12e to protrude therethrough. The substrates 40a and 40b are preferably separated by a form of gasket, ridge on either substrate, or any other suitable means to space the substrates 40a and 40b apart. The preferred spacing is about 0.060"-0.090". The substrates 40a and 40b are secured between the frame portions 41b and 41c by suitable interlocking elements on the frame portions 41b, 41c, adhesive, etc. It should also be appreciated that only ASICs 39a-39c are illustrated in FIG. 3A to prevent cluttering of the drawing. In practice, however, the substrates 40a and 40b will support preferably five ASICs thereon, that is, one for each module 12a-12e. Also, it will be appreciated that the input plates $42a_1$-$42i_1$ are disposed on the undersurface of substrate 40a are therefore hidden from view in the drawing of FIG. 3A.

Returning to FIG. 2, a more detailed illustration of the electrical interconnections between the input switching circuit 16, the output switching circuit 20 and the capacitive probe 12 illustrated in FIG. 1 is provided. For simplicity, the input switching circuit 16, which comprises single pole, four throw switching circuits 16a and 16b (FIG. 1), has been drawn as one single pole, eight throw switch. Likewise, the output switching circuit 20, which as shown in FIG. 1 includes four independent single pole four, throw switching circuits $20a_1$, $20a_2$, $20b_1$ and $20b_2$, has been drawn such that switching circuits $20a_1$ and $20a_2$ are shown as one single pole, eight throw switching circuit 20a. Switching circuits $20b_1$ and $20b_2$ have been drawn as one single pole, eight throw switching circuit 20b.

With continuing reference to FIG. 2, it will be noted that the module 12a comprises a plurality of input plates $42a_1$, $42b_1$, $42c_1$, $42d_1$, $42e_1$, $42f_1$, $42g_1$, $42h_1$ and $42i_2$. It will be noted that plates $42h_1$ and $42i_2$ each form, in effect, a half of a capacitive input plate. Positioned offset from each of the input plates $42a_1$-$42g_1$ are a plurality of eight capacitive output plates $42a_2$, $42b_2$, $42c_2$, $42d_2$, $42e_2$, $42f_2$, $42g_2$ and $42h_2$. The input plates $42a_1$ and $42g_1$ are offset in their position along the axis of measurement of the probe 12 such that input plate $42a_1$ overlaps portions of both of adjacent plates $42a_2$ and $42b_2$. Similarly, input plate $42b_1$ overlaps portions of output plates $42b_2$ and $42c_2$, and so forth. Thus, each one of input plates $42a_1$-$42g_1$ overlaps a pair of adjacently positioned output plates. The plates $42a_1$-$42i_1$ and $42b_1$-$42b_2$ represent one group of capacitive plates of a particular one of the modules 12a-12e, for example, the topmost module 12a on the substrate 40.

In practice, when the second module 12b is electrically coupled to module 12a, the uppermost input plate of (i.e., half plate) module 12b will be electrically coupled to input plate $42h_1$, thereby forming a single, full-size input plate which itself will overlap with the lowermost output plate $42h_2$ of module 12a and the uppermost output plate of module 12b. The bottommost input plate of the probe 12, which will be a half size plate such as plate $42h_1$, will be electrically coupled to the top input plate $42i_1$ to complete the arrangement of input plates $42a_1$–$42i_1$. The drawing of FIG. 2 has been presented with the bottommost half plate $42h_1$ electrically coupled in parallel to the topmost half plate $42i_1$ for purposes of explanation and to show how the input plates of one single module would be arranged to form a complete assembly of input and output plates.

Turning now to the sequence of operation of the switching circuits 16, 20a and 20b, when the switches are placed in the positions as shown in the drawing of FIG. 2 by appropriate switch control signals from the counter 32, an input signal from the oscillator 14 excites input plate $42a_1$. Since this input plate overlaps output plates $42a_2$ and $42b_2$, each one of these output plates will be simultaneously excited and a current coupled onto each. The magnitude of the current will vary according to the capacitance of the capacitor formed by input plate $42a_1$ and output plate $42a_2$, and the capacitance of the capacitor formed by input plate $42a_1$ and output plate $42b_2$. The capacitance, of course, varies with the dielectric constant. The capacitance of any particular capacitor formed by an input plate and an output plate is reduced, typically by at least 50%, when an output plate which is submerged in fluid becomes disposed in air. Accordingly, the capacitance is reduced, and thus the output current coupled onto the particular output plate $42a_2$–$42h_2$ is also reduced.

With continuing reference to FIG. 2, output currents are coupled onto output plate $42a_2$ and output plate $42b_2$. Since both output plates $42a_2$ and $42b_2$ are excited by the same input plate ($42a_1$), and thus the same input signal, the phase of the two signals coupled onto these two output plates will be the same provided the dielectric constant is the same for the two output plates $42a_2$ and $42b_2$. The signal from output plate $42a_2$ is transmitted through the switching circuit 20a to the first phase lock loop 18a. The current coupled onto the output plate $42b_2$ is coupled via switching circuit 20b to the second phase lock loop 18b. After these output signals are compared by the exclusive OR-gate 22, the counter 32 generates appropriate switch control signals to the switching circuits 16, 20a and 20b to cause the input signal from the oscillator 14 to be coupled onto input plate $42b_1$, and the output plate $42b_2$ and the output plate $42c_2$ to be coupled to switches 20a and 20b, respectively. Subsequently, the currents coupled onto output plates $42b_2$ and $42c_2$ are transmitted via the switches 20a and 20b to the phase lock loops 18a and 18b. Thus, the counter 32 applies appropriate switch control signals to sequentially excite each one of the input plates $42a_1$–$42g_1$, one at a time, until all have been coupled to the output of the oscillator 14. Since input plates $42h_1$ and $42i_1$ are connected in parallel, exciting input plate $42h_1$ simultaneously excites input plate $42i_1$.

The counter 32 similarly works to generate switch control signals appropriate to control switching circuits 20a and 20b such that adjacent pairs of output plates 42a–42g are sequentially coupled, one pair at a time, to the switching circuits 20a and 20b, and therefore to the phase lock loops 18a and 18b. The counter 32 further synchronizes the switching of the input and output switching circuits such that only the output plates which overlap the particular input plate being excited at a given time are coupled to the phase lock loops 18a,18b. The counter 32 also synchronizes the switching circuit 34 to the input switching circuit 16 such that the appropriate resistor R1–R8 is coupled to the output of the flip flop 38b at the appropriate time.

The counter thus sequentially enables a series of independent comparisons to be made between adjacent output plates, one pair at a time, to determine if a change in capacitance has occurred as evidenced by a difference in the phase of the output current signals coupled onto the selected pair of output plates. From the above, it will be appreciated by those of ordinary skill in the art that the resolution, and therefore the accuracy, of the capacitive sensor probe 12 depends at least in part on the overall number of capacitive elements on the probe. Where extreme accuracy is important, a greater number of physically smaller capacitive elements could be provided along the length of probe 12 to provide an even greater measure of accuracy with respect to the detected level of the fluid within a reservoir.

It will also be appreciated that since a plurality of independent modules 12a (i.e., 5 modules overall) will preferably be employed, that some means, for example, a conventional multiplexer circuit, may be required to multiplex the output signal generated by each module 12a–12e to the external display 26. In some instances, however, depending on the form of the display 26, such a circuit might not be required.

Figure 6:
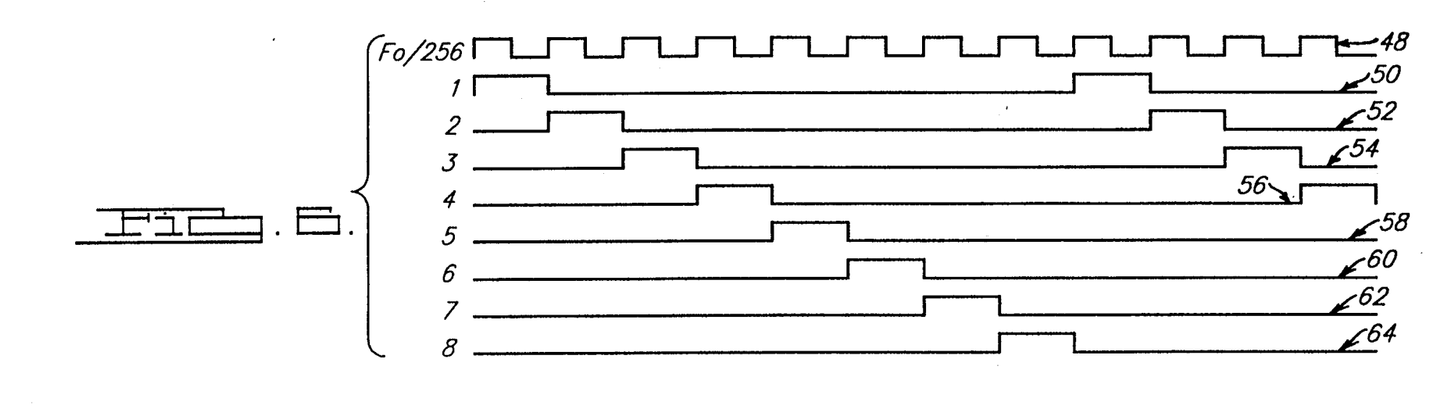
FIG. 6 is a timing diagram of the switching waveforms used to sequentially couple the oscillating input signal to individual input plates of the capacitive probe.

With further reference to FIGS. 1 and 6, the VCOs 19a and 19b of the phase lock loops 18a and 18b are locked to the same frequency because of the common input signal used to excite the particular pair of output plates being sensed. The relative phase between the outputs of the VCOs 19a and 19b varies dependent upon the capacitance of the capacitors formed using the particular pair of output plates being sensed. If the sensed output plates (i.e., any particular pair of output plates $42a_2$–$42h_2$) are both disposed in air or both submerged in fluid, the outputs from the VCOs 19a and 19b will be in phase. When the fluid drops out of one of the pair of sensed output plates $42a_2$–$42h_2$, while the other one of the pair remains submerged in fluid, the capacitance change experienced is directly related to the dielectric constant of the fluid. Thus, the outputs from the VCOs 19a, 19b will no longer be in phase. Instead, the phase of the VCO output from the output plate which is then disposed in air will advance relative to the phase signal output from the other VCO. Since the dielectric constant of various fuels can vary widely, the relative phase difference between the output signals from the VCOs 19a, 19b can also be used as an indication of the fuel's composition. This phase difference can also be used to sense the presence of water in the bottom of the reservoir if the dielectric constant of water is taken into effect when analyzing the degree of phase difference (i.e., phase "shift") between the outputs of the two VCOs 19a, 19b.

With continued reference to FIG. 1, the outputs of the VCOs 19a, 19b are applied to the inputs of the exclusive OR-gate 22. When the outputs of the VCOs 19a, 19b are both at logic zero ("0") levels, indicating the outputs of the VCOs 19a, 19b are in phase, the output of the exclusive OR-gate is a logic zero. If the outputs are not in phase, then the output of the exclusive OR-gate 22 is a logic 1 level signal. Those skilled in the art will readily appreciate that this logic could easily be reversed with suitable logic circuitry if desired.

The output of the exclusive OR-gate 22 is applied to the D input of the D flip flop 38a. The output of the VCO 19b is also applied to the clock input of D flip flop 38a as a clock signal. If the output from VCO 19b is a logic 1 level signal, the output of D flip flop 38a will toggle to a logic 1 and remain such for the length of time that the particular pair of output plates coupled to the phase lock loops 18a, 18b is sensed.

The output of the D flip flop 38a is applied to the D input of D flip flop 38b. The output of the inverting amplifier 36 provides the 70.3125 KHz clock signal used to clock the D flip flop 38b. Since the clock signal generated by the oscillator 14 is inverted by the inverting amplifier 36, the positive going transition of the clock pulse arrives in the middle of the pulse provided at the D input of D flip flop 38b from the output of D flip flop 38a. The clock signal then serves to hold the output of the D flip flop 38b at the logic 1 level during the entire period of a single clock pulse.

The output of the D flip flop 38b is applied to the inputs of switching circuits 34a and 34b. The counter 32 also applies switch control signals to the switching circuits 34a and 34b. The output of the D flip flop 38b is multiplexed by appropriate control signals from the counter 32 to couple the output of D flip flop 38b to weighted resistance values provided by the appropriate resistor $R_1$-$R_8$ in the resistive ladder. A digital to analog (D/A) conversion is performed such that an analog voltage is developed across each of the resistors R1-R8 sequentially. An overall output voltage is taken across point 44 and point 46. The output voltage produced depends on the voltage drop across the particular resistor R1-R8 coupled to the output of the D flip flop 38b at any given time. Points 44 and 46 can be coupled to a suitable external display device to provide a visual (or even audible) indication of the fluid level within a reservoir being monitored. It will be appreciated that variables such as the shape of the reservoir and its total volume, as well as the positioning of the capacitive sensor probe 12 within a reservoir, all must be taken into account to provide an accurate representation of the fluid level within the reservoir. For example, if the fluid reservoir is shaped such that the mid-point of the axis of measurement does not necessarily correspond to a 50% full level, then appropriate calculations must be made to compensate for the shape of the reservoir such that an accurate indication is given when the reservoir is in fact 50% full. It will also be appreciated that suitable baffling may be included in the reservoir itself to help further limit the amount of sloshing or fluid turbulence within the reservoir. In some applications, this may be desirable to help prevent transient, erroneous fluid level readings due to severe bumps, jolts, etc. experienced by a moving vehicle employing the apparatus of the present invention, such as in a fuel tank thereof.

Figure 7:
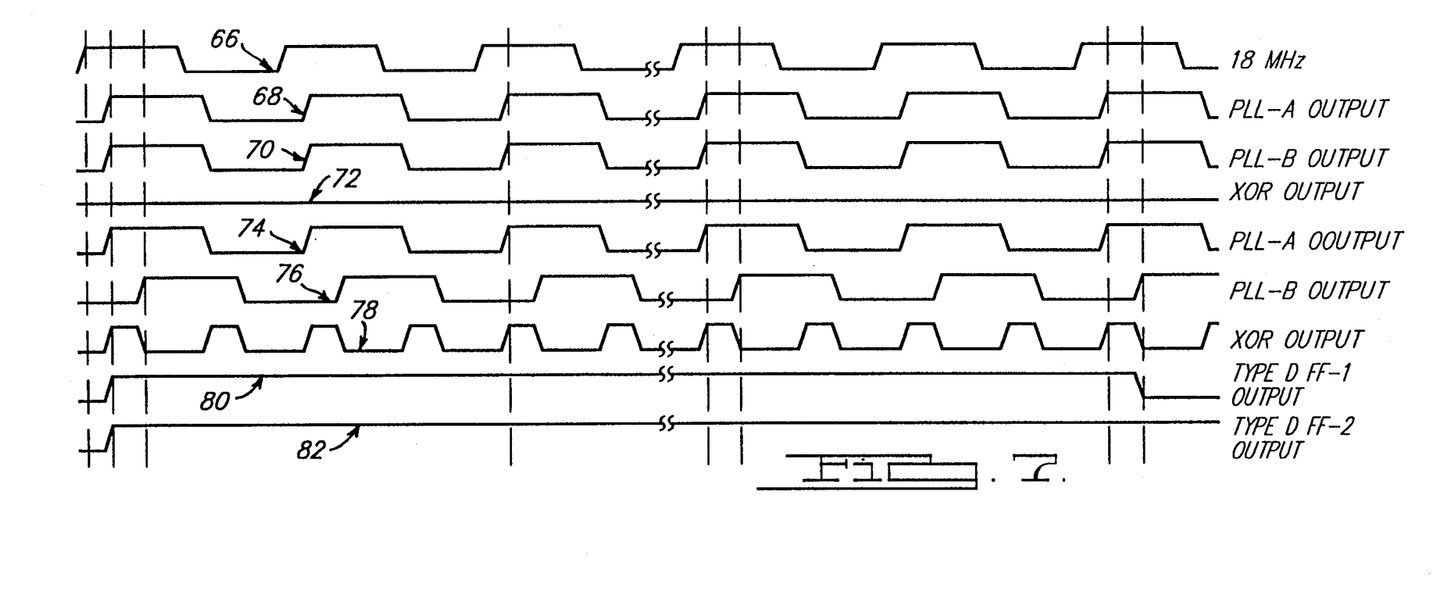
FIG. 7 is a timing diagram showing the various output signals from several of the components of the present invention.

With brief reference to FIGS. 6 and 7, the interrelationships between the various signals of the apparatus 10 are shown to provide an even further understanding of how these signals interrelate. With specific reference to FIG. 6, the switch control signals generated by counter 32 are illustrated. Waveform 48 represents the divided down input clock signal (70.3125 KHz) applied to the counter 32. Waveforms 50-64 represent the switch control signals applied to toggle the individual switches of the switching circuits 16, 20 and 34. It will be noted that the waveforms 50-64 are sequential: waveform 52 goes to a logic 1 level only after waveform 50 has gone to a logic 0 level, waveform 54 goes to a logic 1 level only after waveform 52 has gone to a logic 0 level, and so forth such that each of the switching waveforms 50-64 are at a logic 1 level sequentially, one at a time.

With brief reference to FIG. 7, waveform 66 represents the 18 MHz fixed frequency signal generated by the oscillator 14. Waveforms 68 and 70 represent the outputs of the VCOs 19a and 19b of the phase lock loops 18a and 18b. It will be noted that these waveforms are perfectly in phase and, thus, the output of the exclusive OR-gate 22 is at a logic 0 level, as indicated by waveform 72. Waveforms 74 and 76 illustrate the outputs of the VCOs 19a, 19b when the outputs are out of phase with one another, with the waveform 76 leading the waveform 74. During this condition the output of the exclusive OR-gate 22, as represented by waveform 78, toggles to a logic 1 level at each instance where waveform 74 is at a logic 1 level while waveform 76 is at a logic 0 level. Waveform 80 represents the output of D flip flop 38a, which remains at a logic 1 level during the entire time in which the particular pair of output plates coupled to the phase lock loops 18a and 18b are sensed (when the sensed output plates are out of phase). Waveform 82 represents the output of the D flip flop 38b illustrating that its output is held at the logic level applied to its D input during the entire period of measurement for the particular pair of output plates $42a_2$-$42h_2$. Since the frequency of the clock signal applied to the counter is approximately 70.3125 KHz, the period for the comparison made between any two adjacent output plates $42a_2$-$42h_2$ is approximately 14.22 microseconds in duration. Thus, a different pair of output plates on the probe 12, and a different input plate $42a_1$-$42i_1$, will be used to make a phase comparison approximately every 14.22 microseconds. With a clock frequency of 70.3125 KHz, any change in the fluid level will be sensed virtually instantaneously by the apparatus 10. The apparatus 10 therefore provides the advantage of essentially providing a "real-time" monitoring system for detecting even the most rapid changes in the fluid level of a reservoir.

With further regard to FIG. 1, as described briefly hereinbefore, the optional integrator circuit 28 provides an indication of the composition of the fuel being sensed. The integrator circuit 28 develops an output level which is proportional to the width of the logic level signal generated at the output of the exclusive OR-gate 22. This pulse width is linearly related to the relative phase of the two VCO outputs of the phase lock loops 18a and 18b, which will also be a measure of the dielectric constant of a fuel mixture if fuel is the fluid which is being sensed. This output is therefore indicative of the composition of the fuel and can also be used to determine if water is present in the reservoir (i.e., fuel tank).

It will be appreciated that the apparatus 10, while described as particularly well suited for use as a fuel sensor, could easily be adapted for use with a wide variety of other fluids with little or no modification. Some of such other types of fluids might include transmission fluid, engine coolant, differential fluid, and windshield washer solvent fluid just to name a few.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A liquid level sensor having a capacitive sensor array, wherein said capacitive sensor array is adapted to be disposed in a fluid reservoir along an axis of measurement of fluid contained within said reservoir, and wherein said capacitive sensor array includes a plurality of discrete capacitive input elements and a plurality of discrete capacitive output elements positioned along a length of said array along said axis of measurement, said elements further being positioned such that each one of said input elements overlaps portions of two adjacent ones of said output elements, said apparatus comprising:

means for applying an oscillating input signal to at least one said input element of said sensor array at a time, to thereby generate output signals from a corresponding pair of said output elements overlapping said one input element;

at least one switch coupled to said output elements and to first and second phase detecting means for controllably coupling said output elements to said first and second phase detecting means;

said first phase detecting means being responsive to an output signal from a first one of said corresponding pair of output elements for generating a first frequency signal indicative of one of the presence and absence of said fluid at said first one of said pair of output elements;

said second phase detecting means being responsive to an output signal from a second one of said corresponding pair of capacitive output elements for generating a second frequency signal indicative of one of the presence or absence of said fluid at said second one of said pair of output elements;

phase comparing means for comparing the phase of said first frequency signal with the phase of said second frequency signal and for generating a first output signal indicative of the presence of a phase difference between said first and second frequency signals and a second output signal indicative of no phase difference between said first and second frequency signals;

said first output signal further indicating that said fluid is at least partially absent at one of said corresponding pair of output elements while fluid is present at the other one of said corresponding pair of output elements; and     said second output signal further indicating that said fluid is present at both of said first and second capacitive elements.

2. The apparatus of claim 1, wherein said means for applying an oscillating input signal includes     input switching means for controllably coupling said oscillating input signal to each said input element sequentially, one at a time.

3. The apparatus of claim 2, wherein said at least one switch is operable to couple adjacent ones of said output elements, one pair at a time, sequentially to said first and second phase detecting means.

4. The apparatus of claim 3, wherein said input switching means is synchronized to said at least one switch such that during a time period in which a particular one of said input elements is coupled to said oscillating means, the two adjacent ones of said output elements which each partially overlap said particular one input element will simultaneously be coupled to said first and second phase detecting means for said time period.

5. The apparatus of claim 1, further comprising integrator means responsive to said phase comparing means for generating an integrated output signal indicative of a composition of said fluid within which said input and output capacitive elements are disposed.

6. A capacitive liquid level sensing apparatus comprising:

a capacitive sensor array including a plurality of capacitive input elements and a plurality of capacitive output elements, said output elements being arranged such that adjacent pairs of said output elements overlap portions of a single one of said input elements, said input and output elements being orientated parallel to an axis of measurement of fluid to be measured within a fluid reservoir, and wherein said capacitive sensor array is positioned in said fluid reservoir so as to be at least partially submerged in said fluid;

oscillator means for providing an oscillating input signal to said capacitive sensor array to electrically excite each one of said input elements;

input switch means for sequentially coupling said oscillating input signal to each one of said input elements one at a time to thereby electrically excite one input element at a time;

first phase detecting means responsive to an output for one of each said adjacent pairs of output elements for generating a first frequency signal indicative of a capacitance of said one of each said adjacent pairs of output elements when said one of each said adjacent pairs of output elements is electrically excited by a coupled input element;

second phase detecting means responsive to an output a second one of each of said adjacent pairs of output elements for generating a second frequency signal indicative of a capacitance of said second one of each said adjacent pairs of output elements when said second one of each said adjacent pairs of output elements is electrically excited by said coupled input element;

output switch means interposed between each of said output elements and said first and second phase detecting means;

means for controlling said input and output switch means such that whenever a given input element is coupled to said oscillator means said output switch means couples only an adjacent pair of output elements which overlap said given coupled input element to said first and second phase detecting circuits, thereby causing only said adjacent pairs of said output elements to be coupled to said first and second phase detecting means one adjacent pair at a time;

phase comparing means responsive to each of said first and second phase detecting means for generating a first output signal indicative of a condition in which said outputs of any one of said adjacent pair of output elements coupled to said first and second phase detecting circuits are in phase alignment with one another, and a second output signal indicative of a condition wherein said outputs of any one of said adjacent pair of output elements coupled to said first and second phase detecting circuits are out of phase alignment with one another, said first output signal indicating that both of said capacitive output elements of said coupled adjacent pair are submerged in fluid, and said second output signal further indicating that one of said coupled adjacent pair of output elements is submerged in said fluid while the other one of said coupled adjacent pair of output elements is at least partially disposed out of said fluid.

7. The apparatus of claim 6, further comprising integrator means for integrating said first and second output signals from said phase comparing means to generate a signal indicative of a composition of said fluid.

8. The apparatus of claim 6, wherein said means for controlling said input and output switch means comprises a counter circuit coupled to said input switch means.

9. The apparatus of claim 8, wherein said counter circuit is controlled by a divided down clock signal from said oscillator means.

10. The apparatus of claim 6, further comprising flip flop means responsive to said output signals of said phase comparing means for generating a switching output signal.

11. The apparatus of claim 10, further comprising switching means responsive to said switching output signal of said flip flop means; and
a resistor ladder responsive to said switching means for generating a fluid level output signal indicative of a fluid level within said fluid reservoir.

12. The apparatus of claim 6, wherein each of said first and second phase detecting means comprises a phase lock loop circuit, and wherein each said phase lock loop circuit includes an independent voltage controlled oscillator.

13. The apparatus of claim 6, wherein said phase comparing means comprises an exclusive OR-gate.

14. The apparatus of claim 10, wherein said flip flop means comprises a pair of D flip flops.

15. A liquid level sensing apparatus comprising:
a capacitive sensor array comprising a plurality of input plates and a plurality of output plates, said output plates being further arranged such that portions of each adjacent pair of said output plates overlap one of said input plates disposed on a substrate and arranged along an axis of measurement of a fluid within a fluid reservoir;
oscillator means for generating an oscillating input signal to said capacitive sensor array;
input switch means interposed between said oscillator means and said capacitive sensor array for selectively coupling said input signal from said oscillator means to said input plates, one said input plate at a time, in sequential fashion;
first phase lock loop means responsive to output signals generated on said output plates for generating a phase signal representative of said output signals of a first one of each adjacent pair of said output plates;
second phase lock loop means for generating a phase signal indicative of the phase of an output signal from each second one of said adjacent pairs of output plates;
output switching means for selectively coupling said pairs of output plates, sequentially, one said pair at a time, to said first and second phase lock loop means;
counter means for controlling said input and output switch means;
phase comparing means responsive to said first and second phase lock loop means for comparing outputs from said first and second phase lock loop circuits and for generating a first logic level signal indicative of no phase difference between said output signals from and any given pair of said output plates and a second logic level signal indicative of a phase difference between said output signals from any given pair of said output plates; and
signal conditioning means responsive to said first and second logic level signals of said phase comparing means for generating a fluid level signal therefrom representative of the level of said fluid within said reservoir.

16. A method for detecting the level of a fluid within a fluid reservoir having a capacitive probe placed therein, where the probe includes a plurality of capacitive input elements disposed on a substrate of the probe along an axis of measurement of said fluid and a plurality of output elements positioned on the substrate along said axis such that portions of each adjacent output element of each pair of said output elements overlap one of said input elements and wherein the probe is disposed within said reservoir such that said input and output elements are at least partially submerged in said fluid, the method comprising the steps of:
generating an oscillating excitation signal;
causing the capacitive input elements disposed on said substrate to be electrically excited by said excitation signal, sequentially, one said input element at a time;
obtaining an output signal generated on each output element of an adjacent pair of capacitive output elements which overlap an input element which is being excited by said excitation signal;
generating a phase signal from each one of said output signals generated by said adjacent pair of output elements;
comparing the phase of each said phase signal;
generating a first signal indicative of a phase difference between said phase signals when said phase signals are not in phase;
generating a second signal indicative of no phase difference between said phase signals when said phase signals are in phase with each other;
using said first signal to indicate a fluid-air interface at a specific level within said reservoir; and
using said second signal to indicate the presence of said fluid at a specific level within said reservoir.

17. The method of claim 16, further comprising the step controlling switching of said output elements such that only adjacent pairs of said output elements are sensed sequentially, only one said adjacent pair at a time, to thereby enable a plurality of independent comparisons to be made between every adjacent pair of said output elements on said probe.

* * * * *